United States Patent [19]

Kunert

[11] Patent Number: 5,798,133
[45] Date of Patent: Aug. 25, 1998

[54] METHOD FOR MAKING BACON BITS FROM RAW BELLIES

[75] Inventor: Gale F. Kunert, Austin, Minn.

[73] Assignee: Hormel Foods Corporation, Austin, Minn.

[21] Appl. No.: 864,925

[22] Filed: May 29, 1997

[51] Int. Cl.$^6$ .................................. A23L 1/01; A23L 1/31
[52] U.S. Cl. .................... 426/438; 426/443; 426/465; 426/473; 426/518; 426/523; 426/455; 426/456
[58] Field of Search .................................. 426/438, 443, 426/455, 456, 464, 465, 473, 510, 511, 518, 523, 524

[56] References Cited

U.S. PATENT DOCUMENTS

| | | | |
|---|---|---|---|
| 3,997,672 | 12/1976 | Stead et al. | 426/646 X |
| 4,218,492 | 8/1980 | Stead et al. | 426/646 |
| 4,552,768 | 11/1985 | Olander | 426/480 |
| 5,520,944 | 5/1996 | Richardson et al. | 426/438 |
| 5,567,460 | 10/1996 | Afman | 426/264 |
| 5,637,342 | 6/1997 | Brooks et al. | 426/523 |

*Primary Examiner*—Milton Cano
*Attorney, Agent, or Firm*—Mau & Krull, P.A.

[57] ABSTRACT

A method of making bacon bits from raw bellies. The raw bellies are sized to a first size. Then, the sized bellies are mixed with water and curing ingredients to form a product mixture. The mixture is heated to above 120° F. wherein protein within the product mixture is substantially denatured. The product is then mixed further and then heated to at least 180° F. Finishing processing takes the product mixture to a water activity level of 0.85 or less. In one embodiment, encapsulated salt is added with the curing ingredients. In another embodiment regular salt is added after the protein has been denatured. In both embodiments, the salt does not reach the protein within the bacon until the protein has been denatured.

22 Claims, 3 Drawing Sheets

FIG. 2
FIG. 3
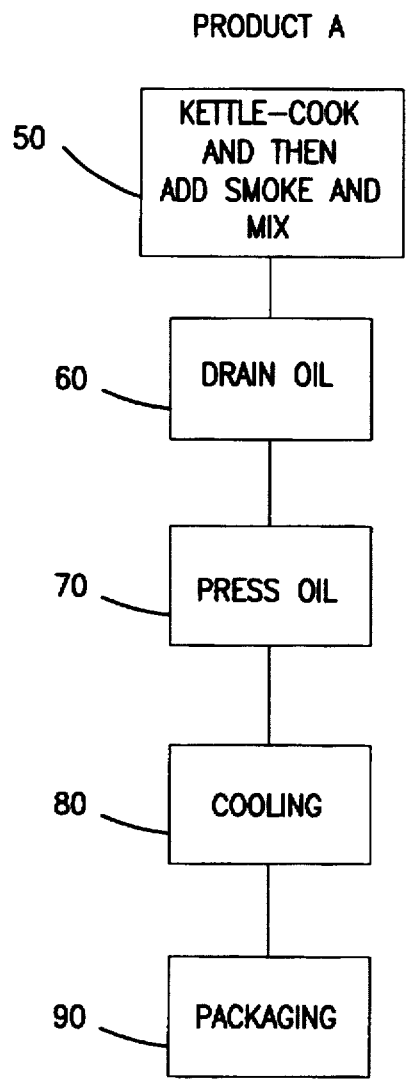
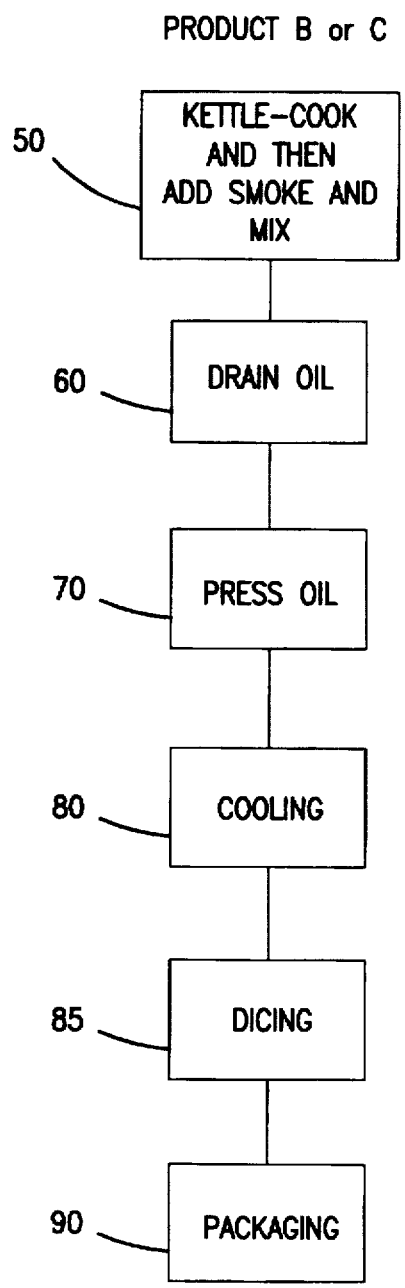

PRODUCT B or C

METHOD FOR MAKING BACON BITS FROM RAW BELLIES

BACKGROUND OF THE INVENTION

1. Field of the Invention

This invention relates generally to making bacon bits and more particularly to making bacon bits from raw pork bellies.

2. Description of the Prior Art

Bacon bits are used to garnish a variety of foods such as potatoes, salads, and vegetables. In addition, bacon bits may also be used as an ingredient in various food dishes such as egg dishes and sauces. Imitation bacon bits may be made from vegetable protein to resemble the cooked bacon. Real bacon bits are typically made either from grinding raw bacon and cooking it or cooking the bacon, then chilling the bacon and passing the bacon through a grinder or dicer.

It is the goal of any process for making bacon bits to have the bacon bits appear as true pieces of bacon and not ground clumps of bacon. Further, it is also desirable that the bacon bits have a uniform appearance and a dark red color.

Examples of a bacon finishing method are found in U.S. Pat. No. 4,552,768. It is also known to prepare bacon bits by taking bacon ends and pieces, which remain from other processes, and grinding them through a ⅛ inch diameter plate into a jacketed steam kettle. Then, the temperature is raised to 220° F. and is cooked under vacuum to a water activity level of approximately 0.75. The oil is then drained from the bacon ends and pieces. The oil is then further removed by pressing the bacon ends and pieces. Finally, the bacon ends and pieces are chilled and packaged.

One of the major disadvantages of using bacon pieces is that it requires there always be trimmings left over from other operations. Therefore, a consistent supply of bacon ends and pieces is not always available. There are sometimes shortages of ends and pieces and special bacon has to be made just to meet production demands for the bacon bits.

As with any bacon bits, it is always desirable to obtain a dark red color for the finished product. Still further the product should have a better texture, that is being crisper and more brittle, but not too hard.

The present invention addresses the problems associated with the prior art and provides for a process of making bacon bits using raw pork bellies.

SUMMARY OF THE INVENTION

The present invention is a process for making bacon bits from raw bellies including sizing the raw bellies to a first size. The sized bellies are then mixed with water curing ingredients and encapsulated salt to form a product mixture. The product mixture is then heated to above 120° F. wherein protein within the product mixture is substantially denatured before the encapsulated salt is released, thereby avoiding clumping of the product mixture. The product mixture is then mixed. The product mixture is then heated to at least 180° F. and the product mixture is then further processes to a water activity 0.85 or less.

The invention is also a process for making bacon bits from raw bellies including sizing the raw bellies to a first size. Then, mixing water, the sized bellies, and cure ingredients together. The product mixture is heated to above 120° F. wherein the product mixture is substantially denatured. Salt is then added to the product mixture. The product mixture is mixed and subsequently the product mixture is further processed to a water activity level of 0.85 or less.

BRIEF DESCRIPTION OF THE DRAWINGS

FIG. 2 is a schematic block diagram of product A for the steps after those shown in FIG. 1;

FIG. 3 is a schematic block diagram for products B and C for the steps after that shown in FIG. 1.

DETAILED DESCRIPTION OF THE PREFERRED EMBODIMENT

The present invention is a method for making bacon bits using raw pork bellies. The pork bellies that are utilized may be either whole or trimmings. When used in this application, raw bellies will refer to both whole raw bellies as well as belly trim.

Figure 1:
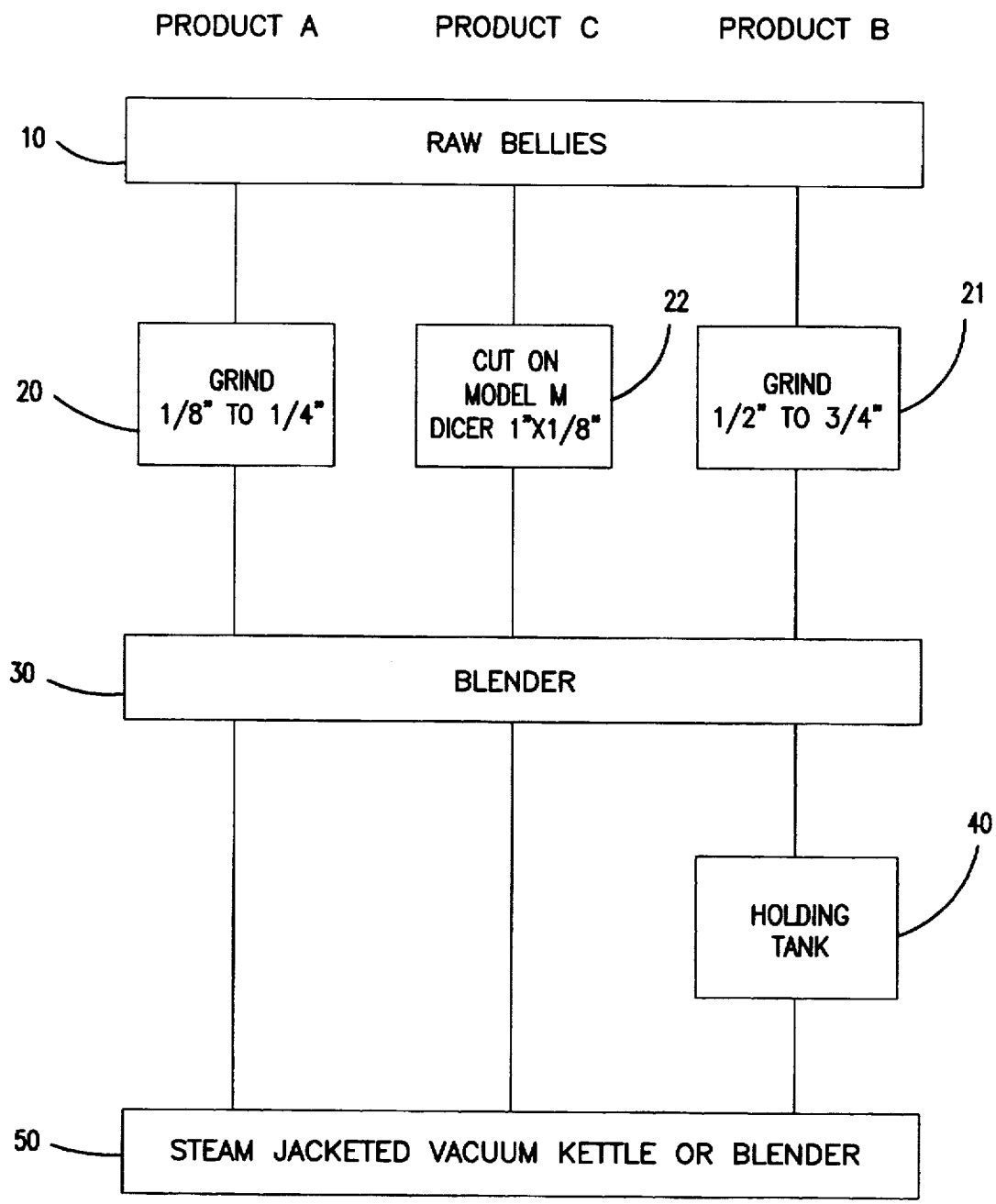
FIG. 1 is a schematic block diagram for three embodiments (Products A–C) of the present invention, up to adding a vacuum in the kettle.

FIG. 1 is a schematic diagram outlining process steps according to the present invention. The schematic in FIG. 1 shows the process for three different products which incorporate some of the same basic steps. The products are listed as products A, B, and C. The process of the present invention starts with raw bellies 10. Products A–C all take the raw bellies 10 and then further process the raw bellies by reducing them to size. For product A, a grinder 20 having a ⅛ inch to ¼ inch opening is used to reduce the size of the raw bellies. For product B, a grinder 21 is used to reduce the size using a ½ inch–¾ inch size openings. Product C uses a dicer, such as an Urschel Model M dicer 22 to reduce the size of the raw bellies to ½ inch square to 1 inch square by ⅛ inch thickness. It is of course realized that other suitable sizes may also be used. Product A starts with a smaller particle size than products B and C. Products A–C are then placed in a blender and combined with water, encapsulated salt, sugar, dextrose, erythobate, sodium nitrate, and smoke flavoring and mixed for approximately 5 minutes to form a product mixture. It is of course understood that any suitable amounts of these ingredients may be used. The examples to follow will give specific amounts of ingredients that may be utilized. Further, in the describing of this invention, it is understood that product A, product B, and product C are all run separately in separate batches. They are being described herein concurrently as many of the steps are similar. The encapsulated salt is encased in a high temperature fat which typically will melt at 140° F. An example of such a salt is Cap-Shure® salt by Balchem Corporation. Since the pork belly protein is denatured at approximately 120° F., the protein is denatured before the salt is released. Because of the size of the pieces for product B, it is placed in a holding tank 40 and kept there for at least 12 hours and preferably 24 hours, to allow curing of the sodium nitrite. The product mixture is then moved to a steam jacketed vacuum kettle or blender 50, which are well known in the art. It is understood that the blender 30 and kettle 50 may be one in the same. However, since blender 30 does not need to be able to heat under a vacuum, they could be different apparatus. Bacon fat is added to the product mixture at this point. The bacon fat is typically added at a 100° F.–140° F. or even higher to 180° F. Any suitable proportion of bacon fat to raw bellies may be used. Applicants have found that adding from 0.5 to 0.7 lbs of bacon fat to 1 lbs of raw bellies is preferred. The addition of the bacon fat reduces cook-on and adds flavor to the finished product. After the bacon fat has been added, the product mixture is heated to 120° F. to 145° F. Once this temperature range has been reached, the temperature is held and the product mixture is agitated for a period of time. The purpose of the agitation is to help break up particles of the pork bellies that may have become attached to each other. The agitation further assists in uniformly heating the product and also sets the color. The longer the agitation the better the separation. It is preferable that there is at least 15 minutes of agitation, and 1 hour is more preferred. The range of 120° F. to 145° F. is preferable, but a temperature in the range of 120° F. to 180° F. is acceptable. As previously discussed, protein is typically denatured at 120° F. Therefore, the salt should be encapsulated in a fat that melts at a temperature above 120° F. While in the vacuum kettle 50, the product mixture is heated to 180° F. to 220° F. After the product mixture reaches the desired temperature, the kettle 50 is sealed and a vacuum is added. Typically the vacuum would be in the range of 19 inches to 21 inches Hg.

The use of the encapsulated salt in the present invention allows the product mixture to reach the temperature of 120° F. without the salt contacting the protein. At 120° F. the protein is denatured and salt may then be added without the clumping that occurs when salt is added prior to the denaturing of the protein. It is possible to utilize the present invention without using encapsulated salt. In those instances, it would be necessary to not add the salt to the blender 30. Instead, the salt would be added to the kettle 50 after the protein has been substantially denatured. It is appreciate that either method would be successful. However, the use of encapsulated salt makes the process a one-step process rather than a two-step process, thereby simplifying production.

FIG. 2 shows the continuing process of the present invention for product A. Product A, in kettle 50 is cooked sufficiently to lower product A's water activity level to a range of from 0.7 to 0.85 and preferably from 0.72 to 0.76. The closer the water activity level is to the preferred 0.72 to 0.76, the closer the color will be to the desired dark red color. Smoke flavoring is then added and the product is then mixed to make certain that the smoke flavoring is fully mixed throughout the product. Typically this is for approximately 2 minutes. The oil is then drained in a drain basket 60 and subsequently the oil is further pressed in press 70 to remove more oil from the product. Product A is cooled sufficiently by a cooling tunnel 80, which is well known in the art. The temperature is reduced to approximately 100° F. by the cooling tunnel. Preferably, the temperature is further reduced to 60° F. to 65° F. for packaging. Finally, the product is packaged by a suitable packaging apparatus 90 again, by a suitable means well known in the art.

FIG. 3 provides a schematic diagram of the finishing of products B and C in a manner quite similar to that described with respect to FIG. 2 and product A. That is, products B or C are cooked in kettle 50 sufficiently to lower the products activity level to a range of from 0.7 to 0.85 and preferably from 0.7 to 0.76. The closer the water activity level is to the preferred 0.72 to 0.76, the closer the color will be to the desired dark red color. Smoke flavoring is then added and the product is then mixed to make certain that the smoke flavoring is fully mixed throughout the product. Typically, this is for approximately 2 minutes. The oil is then drained into a drain basket 60 and subsequently the oil is further pressed in press 70 to remove more oil from the product. Product B or C is then cooled sufficiently by a cooling tunnel 80, which is well known in the art. The temperature is reduced to approximately 100° F., by the cooling tunnel. Preferably, the temperature is further reduced to 60° F. to 65° F. for packaging. Then, as a departure from that described with respect to FIG. 2 and product A, the products B and C are then diced by suitable dicing apparatus 85 to reduce the size of the particle to a second size, of smaller than the first size. Typically, the product would go through a ⅛ inch dicing head, although it is understood that the size of the pieces could be altered by simply changing the size of the dicing head. Then, the product is packaged by suitable packaging apparatus 90 again, by means well known in the art.

Figure 4:
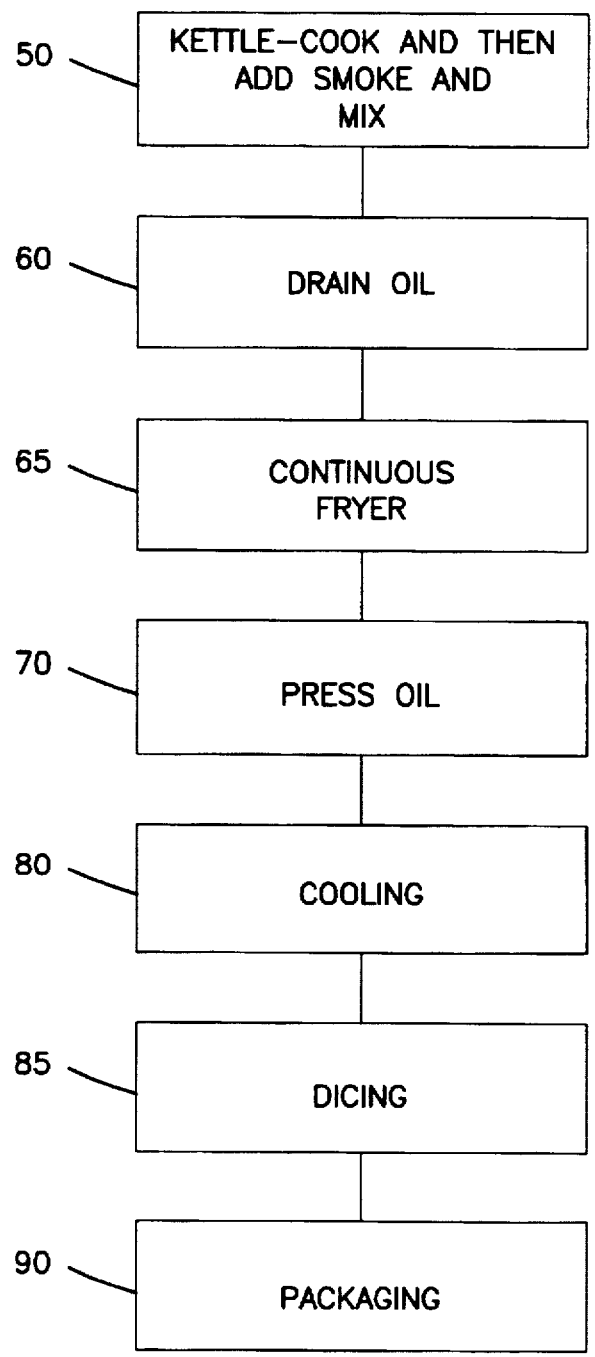
FIG. 4 is a another schematic block diagram for another option for products B and C after the steps shown in FIG. 1.

FIG. 4 shows another option of the continuing process of products B and C utilizing the present invention. Product B or C is in kettle 50 and is cooked sufficiently to lower the water activity level to a range of from 0.75 to 0.9, preferably from 0.8 to 0.9 and preferred embodiment from 0.82 to 0.85. Smoke and flavoring is added and the product mixture is then mixed for approximately 2 minutes.

When at the first water activity level, the color of the bacon ends and pieces are a pink color. The bacon slurry is then pumped to a drain basket 60 and fat, which is then obtained from cooking the product, is separated. The product B or C is then fed into a continuous oil fryer 65. Bacon fat at a temperature of between 290° F. to 300° F. is typically used in the continuous oil fryer. The bacon ends and pieces are in the continuous oil fryer until the desired second water activity level is achieved. The second water activity level is between 0.7 to 0.8 and preferably between 0.72 to 0.76. It is understood that the individual pieces may have some variation, but it is preferred that the averages be in the discussed ranges. The product B or C are in the continuous fryer 65 sufficient to achieve either this desired water activity level or until the desired color level is achieved. This typically is 30 to 50 seconds. The desired color at the second water activity level is a dark red color. Also, at the desired second water activity level the product has a better texture, that is being crisper and more brittle, but not too hard. The oil is then pressed out of the product in press 70. The products B or C is then cooled sufficiently by a cooling tunnel 80 which is well-known in the art. The temperature is reduced to approximately 100° F. by the cooling tunnel. Preferably, the temperature is further reduced to 60° F. to 65° F. for packaging. Then, the product is diced through a ⅛ inch dicing head in a suitable dicer 85 or other suitable sizes (i.e., from ¼ inch to ⅛ inch) to bring the product to a second size, which is smaller than the first size. By further dicing the product, a final product that appears more like sliced cooked bacon that has been cut or broken up is achieved. The products B and C are then ready for further packaging by packager 90 by a suitable means well-known in the art.

Another advantage of using raw bellies as the initial source of product is that uniform salt levels are achieved. Presently, when many sources of bacon ends and pieces are used to make bacon bits, different pickle formulations are used and the finished salt level varies. This is avoided using the present invention. Also, the present invention allows for different flavors to be obtained. It is easy to add different flavors or spice levels. Flavorings can be added at the blender 30 and are easier to control than pumping into the raw bellies 10.

Example 1, which follows, is an example of adding the salt prematurely and the resulting clumping. Example 2 is where encapsulated salt was used and Example 3 is where regular salt was used after the protein was denatured.

EXAMPLE 1

| Regular Salt No Denaturing | |
|---|---|
| | Pounds |
| #2 Raw Bellies | 30.0000 |
| Bacon Fat | 20.0000 |
| Water | 2.8100 |
| Salt | 0.5240 |
| Sugar | 0.0480 |
| Dextrose | 0.0110 |
| Sodium Erythorbate | 0.0110 |
| Sodium Nitrate | 0.0028 |
| Smoke Flavor | 0.0560 |
| | 54.4628 |

The #2 bellies were ground in a grinder having a ¼ inch opening. The salt and all of the ingredients, except for bacon fat, was added to the blender 30 and mixed for 5 minutes. The mixture was then transferred to the jacketed vacuum kettle or blender 50 and heat was added to raise the temperature to 200° F. The bacon was clumped or bound together by protein extraction caused by the salt addition. The product did not separate after cooking and further processing of the product was not possible.

EXAMPLE 2

| Encapsulated Salt Used | |
|---|---|
| | Pounds |
| #2 Raw Bellies | 35.0000 |
| Bacon Fat | 20.0000 |
| Water | 3.3000 |
| Encapsulated Salt | 1.1000 |
| Sugar | 0.1540 |
| Dextrose | 0.0440 |
| Sodium Erythorbate | 0.0128 |
| Sodium Nitrate | 0.0033 |
| Smoke Flavor | 0.0242 |
| | 59.8561 |

The #2 raw bellies were ground using a grinder having a plate having a ¼ inch opening. All the ingredients, except for bacon fat, were added to the blender 30 and mixed for 5 minutes. The product was transferred to the jacketed blender 50 and 20 pounds of bacon fat was added at 100° F. Additional heat was added to the mixture 50 to raise the temperature to 120° F. and the heat was shut off and the mixer kept mixing for 60 additional minutes. The heat was then turned back on and the temperature was brought to 200° F. At that time, the mixer was closed and a vacuum of 19 to 21 inches Hg was added and the product was allowed to cook for 70 additional minutes. The product was then finished by draining the oil, pressing the oil from the product, cooling and packaging and resultant bacon bits had good flavor and a deep red color.

EXAMPLE 3

| Regular Salt Used After Protein Denatured | |
|---|---|
| | Pounds |
| #2 Raw Bellies | 30.0000 |
| Water | 2.8100 |
| Salt | 0.7560 |
| Sugar | 0.0480 |
| Dextrose | 0.0110 |
| Sodium Erythorbate | 0.0110 |
| Sodium Nitrate | 0.0028 |
| Smoke Flavor | 0.1828 |
| | 33.8216 |

The #2 bellies were ground in a grinder 20 having a 5/16 inch opening in its plate. All ingredients were added to the jacketed blender 50 and mixed for 5 minutes and the temperature was raised to 135° F. The heat was shut off and the mixer kept mixing for an additional 40 minutes. Salt was then added to the blender 50 and the blender kept mixing for an additional 20 minutes. The heat was turned back on and the temperature was raised to 200° F. at which time the mixer was closed and a vacuum of 19 to 21 inches Hg was added. The product cooked for an additional 95 minutes and was finished in the same manner as that set forth in Example 2. There was substantial cook on, as bacon fat was not added.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A process for making bacon bits from raw bellies, comprising the steps of:
   a) sizing the raw bellies to a first size;
   b) mixing water, sized bellies, curing ingredients and encapsulated salt to form a product mixture;
   c) heating the product mixture to above 120° F. wherein protein within the product mixture is substantially denatured before the encapsulated salt is released, thereby avoiding clumping of the product mixture;
   d) mixing the product mixture;
   e) heating the product mixture to at least 180° F.; and
   f) further processing the product mixture to a water activity level of 0.85 or less.

2. The process of claim 1, further comprising grinding the raw bellies through a ⅛" to ¼" plate to a small particle size for the first size.

3. The process of claim 1, further comprising grinding the raw bellies through a ½" to ¾" plate to a large particle size for the first size.

4. The process of claim 1, further comprising cooling the raw bellies to between 24° F. to 28° F. and sizing the raw bellies to approximately one inch square×⅛" thickness for the first particle size.

5. The process of claim 1, further comprising adding bacon fat after step (b), to add flavor to the bacon bits and to reduce cook on.

6. The process of claim 1, wherein the mixing in step (d) is for at least 15 minutes, wherein the product mixture is broken apart.

7. The process of claim 2, wherein the further processing comprises placing the product mixture in a sealed kettle, drawing in vacuum and cooking to the water activity level of 0.76 or less.

8. The process of claim 3, wherein the further processing comprises placing the product mixture in a sealed kettle, drawing a vacuum and cooking to the water activity level of 0.76 or less, and dicing the product mixture to a smaller size.

9. The process of claim 4, wherein the further processing comprising placing the product mixture in a sealed kettle, drawing a vacuum and cooking to the water activity level of 0.76 or less, and dicing the product mixture to a smaller size.

10. The process of claim 3, wherein the further processing comprises:
   a) cooking the product mixture sufficient to bring its water activity level to a first level, wherein the product mixture has a pink color; and
   b) frying the product mixture to bring its water activity level from the first level to a second level, wherein the product mixture has a dark red color.

11. The process of claim 4, wherein the further processing comprises:
   a) cooking the product mixture sufficient to bring its water activity level to a first level, wherein the product mixture has a pink color; and
   b) frying the product mixture to bring its water activity level from the first level to a second level, wherein the product mixture has a dark red color.

12. A process of making bacon bits from raw bellies, comprising the steps of:
   a) sizing the raw bellies to a first size;
   b) mixing water, sized bellies and cure ingredients;
   c) heating the product mixture to above 120° F., wherein protein within the product mixture is substantially denatured;
   d) adding salt to the product mixture;
   e) mixing the product mixture;
   f) further processing the product mixture to a water activity level of 0.85 or less.

13. The process of claim 12, further comprising grinding the raw bellies through a 1/8" to 1/4" plate to a small particle size for the first size.

14. The process of claim 12, further comprising grinding the raw bellies through a 1/2" to 3/4" plate to a large particle size for the first size.

15. The process of claim 12, further comprising cooling the raw bellies to between 24° F. to 28° F. and sizing the raw bellies to approximately one inch square×1/8" thickness for the first particle size.

16. The process of claim 12, further comprising adding bacon fat after step (b), to add flavor to the bacon bits and to reduce cook on.

17. The process of claim 12, wherein the mixing in step (e) is for at least 15 minutes, wherein the product mixture is broken apart.

18. The process of claim 13, wherein the further processing comprises placing the product mixture in a sealed kettle, drawing in vacuum and cooking to the water activity level of 0.76 or less.

19. The process of claim 14, wherein the further processing comprises placing the product mixture in a sealed kettle, drawing a vacuum and cooking to the water activity level of 0.76 or less, and dicing the product mixture to a smaller size.

20. The process of claim 15, wherein the further processing comprising placing the product mixture in a sealed kettle, drawing a vacuum and cooking to the water activity level of 0.76 or less, and dicing the product mixture to a smaller size.

21. The process of claim 14, wherein the further processing comprises:
   a) cooking the product mixture sufficient to bring its water activity level to a first level, wherein the product mixture has a pink color; and
   b) frying the product mixture to bring its water activity level from the first level to a second level, wherein the product mixture has a dark red color.

22. The process of claim 15, wherein the further processing comprises:
   a) cooking the product mixture sufficient to bring its water activity level to a first level, wherein the product mixture has a pink color; and
   b) frying the product mixture to bring its water activity level from the first level to a second level, wherein the product mixture has a dark red color.

* * * * *